C. WYMAN.
VALVE.
APPLICATION FILED DEC. 9, 1908.
918,720.
Patented Apr. 20, 1909.
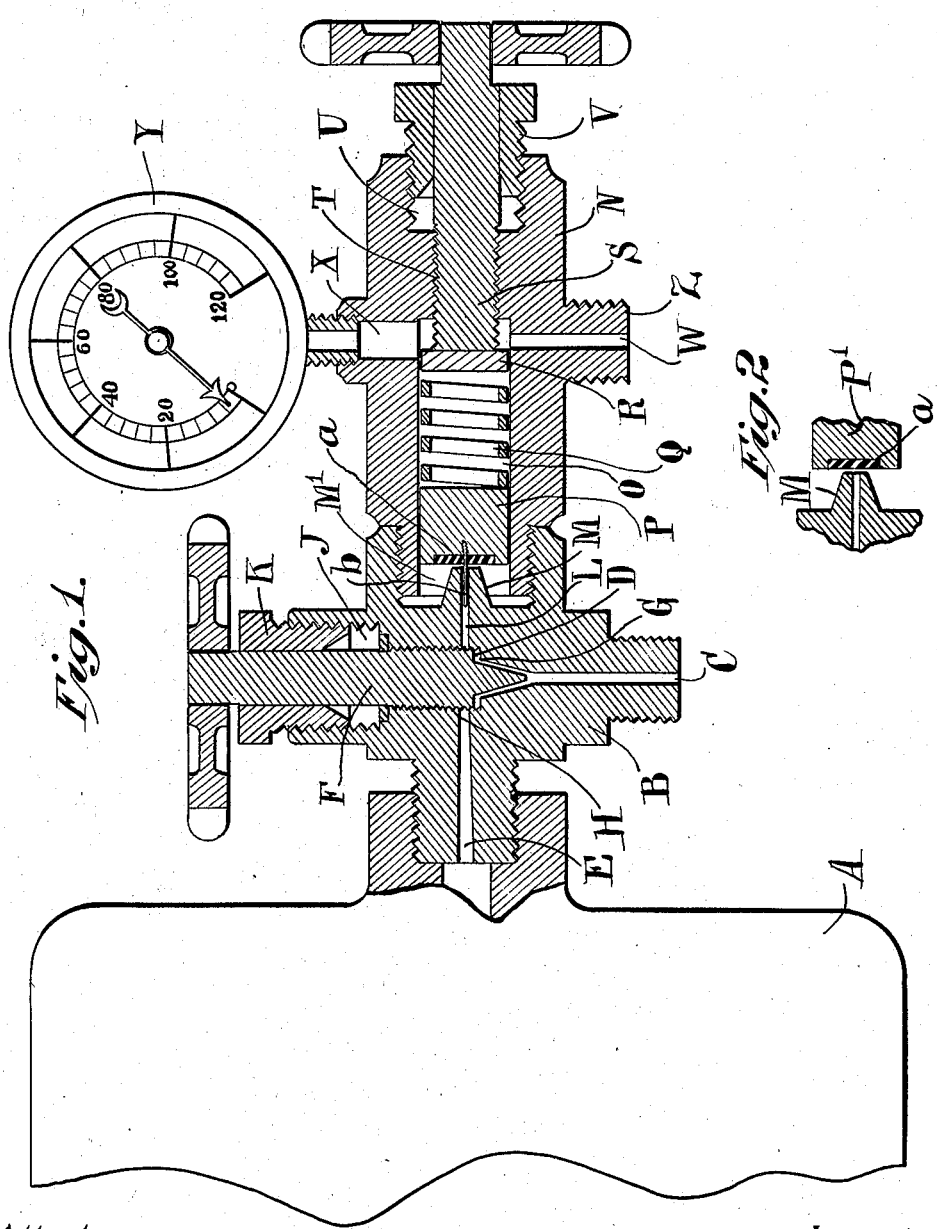

UNITED STATES PATENT OFFICE.

CHARLES WYMAN, OF NEW YORK, N. Y.

VALVE.

No. 918,720.        Specification of Letters Patent.        Patented April 20, 1909.

Application filed December 9, 1908. Serial No. 466,603.

*To all whom it may concern:*

Be it known that I, CHARLES WYMAN, a citizen of the United States, and a resident of the borough of Brooklyn, city of New York, county of New York, and State of New York, have invented certain new and useful Improvements in Valves, of which the following is a specification.

This invention relates to valves, more particularly to inflation valves, and the objects of the invention are to provide an inflation valve for use upon pressure tanks made to contain air or gas under high pressure for the purpose of inflating automobile tires.

The pressure tank above referred to is of convenient size to attach to the body of an automobile and is made sufficiently strong to hold a gas, usually carbonic acid gas, under a pressure of several hundred pounds. From this pressure tank the tires of the automobile are inflated to a pressure much less than the original pressure in the pressure tank and for this purpose an inflation valve is used. The valve must be one that will work easily when it is desired to inflate the tires, and also prevent escape from the tank when the tires are not being inflated.

To the accomplishment of the above objects, and such others as may hereinafter appear, the invention comprises a main valve member provided with an inlet or charging duct leading to a suitable valve-chamber within said member, a further duct leading from said chamber and adapted to convey the air to or from the storage tank, a valve controlling the passage of air or gas from the charging duct to said valve chamber, and another duct leading from said chamber to an orifice in a raised boss located within a bonnet chamber formed in said main section of the valve; and further comprises a valve bonnet adapted to be secured in said bonnet chamber and provided with an internal passage within which is a spring-pressed valve plug adapted to coact with said projecting boss, and a valve stem and spring follower; said bonnet also having ducts leading from such internal passage, one such duct adapted to lead to the pressure gage with which such valves are commonly provided, the other leading to a discharge connection.

Referring to the drawings: Figure 1 is a side elevation showing the inflation valve in cross section, and also showing the inflation valve connected to a pressure tank which is partly in cross section, with parts broken away. Fig. 2 is an alternate form of valve plug.

In the drawings A designates a suitable pressure tank to which is secured in any desired manner the main valve member B which is provided with an inlet or charging duct C leading to a suitable valve chamber D within said member. The main valve member is also provided with another duct E leading from said chamber D and adapted to convey the gas to or from the pressure tank.

The charging duct C is arranged to be opened and closed by means of a valve which consists of a pointed valve stem F the pointed end of which is adapted to close the charging duct C, a suitable valve seat G being provided for this purpose. The valve stem F is provided with suitable threads H which are arranged to engage corresponding threads in the main valve member, which is also provided with a suitable recess J for packing, in which is adapted to fit the gland K. The main valve member is also provided with a duct L one end of which is connected to the chamber D and the other end of which terminates in a raised boss M located within a bonnet chamber M' formed in said main valve member to which is secured a valve bonnet N provided with an internal passage O within which is a spring-pressed valve plug P, adapted to coact with said raised boss M, and a spring Q, together with a spring follower R and a valve stem S, which is provided with suitable threads T arranged to fit corresponding threads in the bonnet which is also provided with a suitable recess U for packing in which is adapted to fit the gland V. The bonnet N is also provided with ducts W and X leading from said internal passage O, the duct X being in communication with a suitable pressure gage Y while the duct W leads to a suitable discharge connection Z to which can be secured a suitable flexible connection for inflating the tires.

From the above construction it will be seen that the pressure tank A can be charged through the ducts C and E by unscrewing the valve stem F which is screwed into position so as to close the duct C when the tank A is full. The duct E is always in communication with the duct L about the threads H which never fit tight enough so as to prevent the gas passing through the same, so that when it is desired to inflate the tires the valve stem S is unscrewed so as to release the pressure of the spring Q against the valve plug P which engages the end of the duct L in the raised boss M and the gas passes into the chamber O and out through the duct W the pressure of the air being discharged into the tire being recorded by means of the gage Y so that when the tire is inflated to a certain pressure the valve stem S is screwed down so as to force the valve plug P against the raised boss M so as to close the duct L.

The end of the valve plug P is preferably provided with a piece of vulcanite or other similar substance $a$ so as to provide a suitable seat for the end of raised boss M. The valve plug P is also preferably provided with a needle $b$ which is adapted to center the plug in the duct L and to restrict the escape of the fluid from this duct when the plug is raised off its seat, it being noted that the needle $b$ does not entirely fill the duct L, there being a very small space around the needle to permit of the escape of the fluid when the plug is raised. The needle $b$ is also very advantageous in keeping the duct L free from dirt, grit and ice.

From the above description it will be seen that a very simple inflation valve is provided which is provided with two independent valves, one used for charging and the other for discharging the gas. It will be seen that the valve for charging is made large so that the tank can be easily filled whereas the discharge valve is made small so as to more readily regulate the escape of the gas. The discharge valve is so constructed that the same can be used a great many times without being repaired and the same works very easily. In Fig. 2 is shown an alternate form of valve plug P' in which the needle $b$ is dispensed with.

While the invention has been described with particular reference to the details of construction, the same is not to be limited thereto as many changes may be made and still fall within the scope of the appended claims.

What I claim and desire to secure by Letters Patent is:

1. The combination of a main valve chamber, an inlet duct therefor, a supply duct communicating with said inlet duct, a main valve controlling communication between said inlet and supply ducts, a delivery duct communicating with said inlet duct, a valve seat and a sliding plug valve controlling said delivery duct, one having a raised boss for coacting with the other, a spring for said sliding valve plug, means for compressing said spring, and a discharge connection provided with a duct communicating with said discharge passage under control of said sliding plug valve.

2. An inflation valve comprising a main valve member provided with a valve chamber, an inlet duct therefor, and two other ducts leading from said chamber, and a valve closing said inlet duct, said main valve member having a bonnet connection and a raised boss within such connection, in the end of which one of said other ducts terminates, and a valve bonnet engaging said bonnet-connection, said bonnet having an internal passage, a valve plug slidably mounted within said passage and adapted to close the orifice of the duct in said boss, a spring for said plug and means for compressing said spring, said bonnet having a discharge connection provided with a duct communicating with said passage in rear of said valve plug.

3. An inflation valve comprising a main valve member provided with a valve chamber, an inlet duct therefor, and two other ducts leading from said chambers, and a valve closing said inlet duct, said main valve member having a bonnet connection and a raised boss within such connection in the end of which one of said other ducts terminates, and a valve bonnet engaging said bonnet-connection, said bonnet having an internal passage, a valve plug slidably mounted within said passage and adapted to close the orifice of the duct in said boss, a spring for said plug, and means for compressing said spring, said bonnet having a discharge connection provided with a duct communicating with said passage in rear of said valve plug and having also a gage connection having a duct likewise communicating with said passage in rear of said valve plug.

4. An inflation valve comprising a main valve member provided with a valve chamber, an inlet duct therefor, and two other ducts leading from said chamber, and a valve for closing said inlet duct, said main valve member having a bonnet connection and a raised boss within such connection in the end of which one of said other ducts terminates, and a valve bonnet engaging said bonnet-connection, said bonnet having an internal passage, a valve plug having a soft face adapted to engage the end of said boss and thereby close the orifice therein, a spring for said plug and means for compressing said spring, said bonnet having a discharge connection provided with a duct communicating with said passage in rear of said valve plug.

In testimony whereof I have signed this specification in the presence of two subscribing witnesses.

CHARLES WYMAN.

Witnesses:
LEO J. MATTY,
PAUL H. FRANK.